DEVICE FOR DEMONSTRATING THE CIRCUITS AND FIELDS
OF ELECTRICAL MOTORS AND GENERATORS

Filed Dec. 14, 1945 11 Sheets-Sheet 1

INVENTOR.
George W. Thompson
BY
M. O. Hayes
ATTORNEY.

INVENTOR.
George W. Thompson
BY
M. O. Hayes
ATTORNEY.

INVENTOR.
George W. Thompson
BY M. C. Hayes
ATTORNEY.

Aug. 15, 1950 G. W. THOMPSON 2,518,506

DEVICE FOR DEMONSTRATING THE CIRCUITS AND FIELDS OF ELECTRICAL MOTORS AND GENERATORS

Filed Dec. 14, 1945 11 Sheets-Sheet 4

INVENTOR.
George W. Thompson

BY M. O. Hayes

ATTORNEY.

INVENTOR.
George W. Thompson
BY
M. O. Hayes
ATTORNEY.

Aug. 15, 1950 G. W. THOMPSON 2,518,506

DEVICE FOR DEMONSTRATING THE CIRCUITS AND FIELDS OF ELECTRICAL MOTORS AND GENERATORS

Filed Dec. 14, 1945 11 Sheets-Sheet 6

INVENTOR.
GEORGE W. THOMPSON

BY M. A. Hayes

ATTORNEY

INVENTOR.
GEORGE W. THOMPSON
BY M. C. Hayes
ATTORNEY.

Aug. 15, 1950 G. W. THOMPSON 2,518,506

DEVICE FOR DEMONSTRATING THE CIRCUITS AND FIELDS OF ELECTRICAL MOTORS AND GENERATORS

Filed Dec. 14, 1945 11 Sheets-Sheet 8

INVENTOR.
GEORGE W. THOMPSON

BY M. C. Hayes

ATTORNEY.

INVENTOR.
GEORGE W. THOMPSON
BY
M. O. Hayes
ATTORNEY.

INVENTOR.
GEORGE W. THOMPSON
BY
M. O. Hayes
ATTORNEY.

Aug. 15, 1950 G. W. THOMPSON 2,518,506

DEVICE FOR DEMONSTRATING THE CIRCUITS AND FIELDS OF ELECTRICAL MOTORS AND GENERATORS

Filed Dec. 14, 1945 11 Sheets-Sheet 11

INVENTOR.
George W. Thompson

BY M. O. Hayes

ATTORNEY

Patented Aug. 15, 1950 2,518,506

UNITED STATES PATENT OFFICE 2,518,506

DEVICE FOR DEMONSTRATING THE CIRCUITS AND FIELDS OF ELECTRICAL MOTORS AND GENERATORS

George W. Thompson, United States Navy

Application December 14, 1945, Serial No. 635,137

8 Claims. (Cl. 35—19)

(Granted under the act of March 3, 1883, as amended April 30, 1928; 370 O. G. 757)

The present invention relates to educational devices and concerns specifically visual training aids for use in providing visual representation of concepts that are intangible and not capable of sensory perception.

It is found in educational programs involving instruction in subjects relating to concepts that are intangible and not subject to sensory perception that considerable difficulty is encountered by instructors in presenting, and by students in comprehending, such concepts. Thus, in educational programs involving the study of electricity and magnetism, considerable difficulty is encountered in presenting instruction involving such intangible concepts as magnetic force, voltage, current flow and the phenomenon of induction. Such concepts do not lend themselves to sensory perception because of their inherent nature, since only the effects produced by such phenomenon can be observed. For example, it is known that passing an electrical conductor through a magnetic field causes a voltage to be induced in the conductor, and while the phenomenon of induction itself is not capable of being observed directly it can be detected by the effect produced when the voltage is induced, for example by the visual effect produced on a galvanometer connected to the conductor.

Instruction regarding electro-mechanical interconverters such as generators and motors for interconverting mechanical energy and electrical energy is facilitated by use of training aids that visualize the intangible concepts involved. For this purpose, charts and diagrams, often employing color, and other visual representations, are used to illustrate the electrical and magnetic phenomena involved. Also employed are mock devices that simulate actual machines such as generators or motors and that are activated mechanically or otherwise to illustrate visually the phenomenon involved. While such devices are often helpful, experience has shown that improvement is desirable to provide a device that simulates closely the tangible parts of the device to be illustrated and affords a clear visual representation of the intangible factors involved.

The educational device of this invention is adaptable to many different uses but has been shown for convenience as a training aid for use in instruction concerning a multiphase alternating-current generator and a multiphase alternating-current motor. Each device can be used independently for demonstration purposes or both can be used in combination for demonstrating generator and motor operation. Mechanical parts of a conventional generator and a conventional motor of this type are reproduced independently, in simplified form for the sake of clarity.

The mock generator consists principally of a stationary transparent faceplate symbolizing a stator, and an opaque disc mounted for rotation centrally in front of the faceplate and symbolizing a two-pole rotor. Magnetic lines of force and electrical windings are shown graphically on the apaque rotor by conventional electrical symbols (hereinafter called "symbols") together with symbols indicating the two poles. Symbols on the transparent stator represent multiphase windings. Lighting means are provided behind the transparent stator multiphase windings and arranged so that with the rotor in any given position the illumination of the windings simulates the instant electrical conditions that prevail in the corresponding windings of an actual generator. Intensity of the light that illuminates any particular winding indicates the intensity with which an actual winding is energized electrically by induction, and color of the light indicates the instant polarity of such energization induced in the winding. This device is arranged so that the rotor can be arrested in any given position to show instant conditions in the various windings, or so that the rotor can be turned to represent the progressively changing conditions that occur in the various windings during operation of an actual generator. Separate phase windings can be illuminated individually to simplify the study of a single phase, or the various windings can be illuminated for study of the relationship between phases.

The mock motor is similar to the mock generator except that parts are constructed to illustrate a motor of either the synchronous or induction type. The mock motor consists principally of a stationary transparent faceplate representing a four-pole stator and a pair of opaque discs mounted for rotation centrally in front of the faceplate and designed for alternative use. One of the discs is designed to represent a synchronous-type rotor and symbols representing rotor windings and the four poles are provided. The other disc is designed to represent an induction-type rotor and symbols representing a squirrel-cage rotor are provided. An index mark is provided on the rotor so that slip between the rotating magnetic field in the stator and the induction rotor can be demonstrated. The lighting system for illuminating the stator windings is similar to the lighting system for the mock generator, but is adapted for the four-pole motor construction.

One object of the invention is to provide an educational device that affords an activated visual representation of concepts that are intangible and incapable of sensory perception.

Another object is to provide an education device for instruction in electro-mechanical interconverters in which an activated visual indication of intangible electrical and magnetic phenomena is provided.

Another object is to provide an educational device in the form of a mock multiphase alternating-current electro-mechanical interconverter in which represented electrical windings are arranged for illumination so that intensity of illumination simulates intensity of energization of the windings, and color of illumination simulates the polarity of energization.

Another object is to provide an educational device in the form of a mock multiphase alternating-current electro-mechanical interconverter in which represented electrical windings are arranged for visual activation to simulate electrical conditions within the windings, and in which the rotor can be arrested to simulate instant conditions in the windings or can be rotated to simulate progressively changing conditions, and in which separate phase windings can be activated individually or collectively.

Another object is to provide an educational device in the form of a mock multiphase alternating-current generator and an independent mock multiphase alternating-current motor in each of which represented electrical windings are arranged for visual activation to simulate electrical conditions within the windings, and in each of which the rotor can be arrested to simulate instant conditions in the windings or can be rotated to simulate progressively changing conditions, and in each of which separate phase windings can be activated individually or collectively, the mock generator and mock motor being adapted for use together for demonstrating generator and motor operation.

Further objects and advantages of this invention, as well as its construction, arrangement and operation, will be apparent from the following description and claims in connection with the accompanying drawings, in which Fig. 1 is a front elevational view of a preferred form of the invention embodying a mock multiphase generator;

Figure 2:
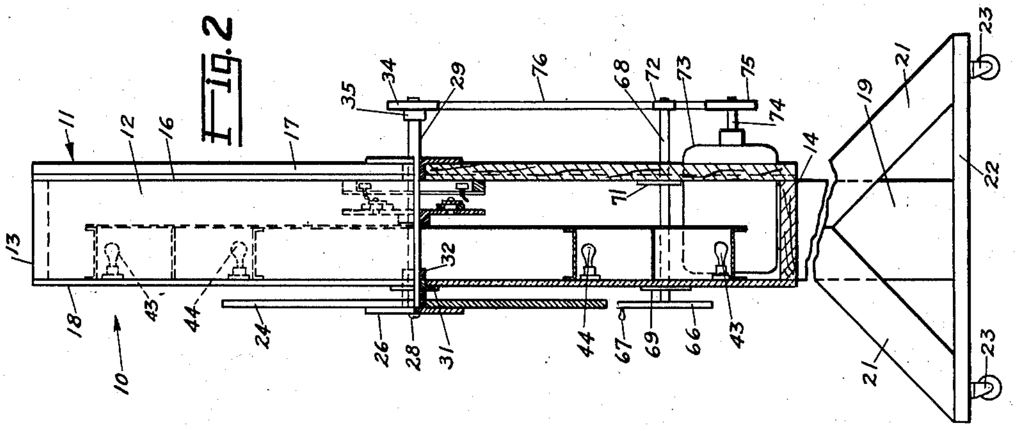
Fig. 2 is a side view, partly in section and partly in elevation of the construction shown in Fig. 1.

Similar numerals refer to similar parts throughout the several views. A mock generator 10 having a framework 11 including a box 12 with a top 13, bottom 14, sides 15 and a back 16 is provided with a vertical reinforcing member 17 (see Figs. 1 and 2). These members may be made of wood or similar material. A cover-plate 18 is provided and is formed from transparent material such as Plexiglas. Box 12 is supported upon vertical legs 19, which are reinforced by cross-braces 20, and each leg is secured by means of anchor members 21 to a platform 22 supported upon casters 23, which render framework 11 movable.

Figure 5:
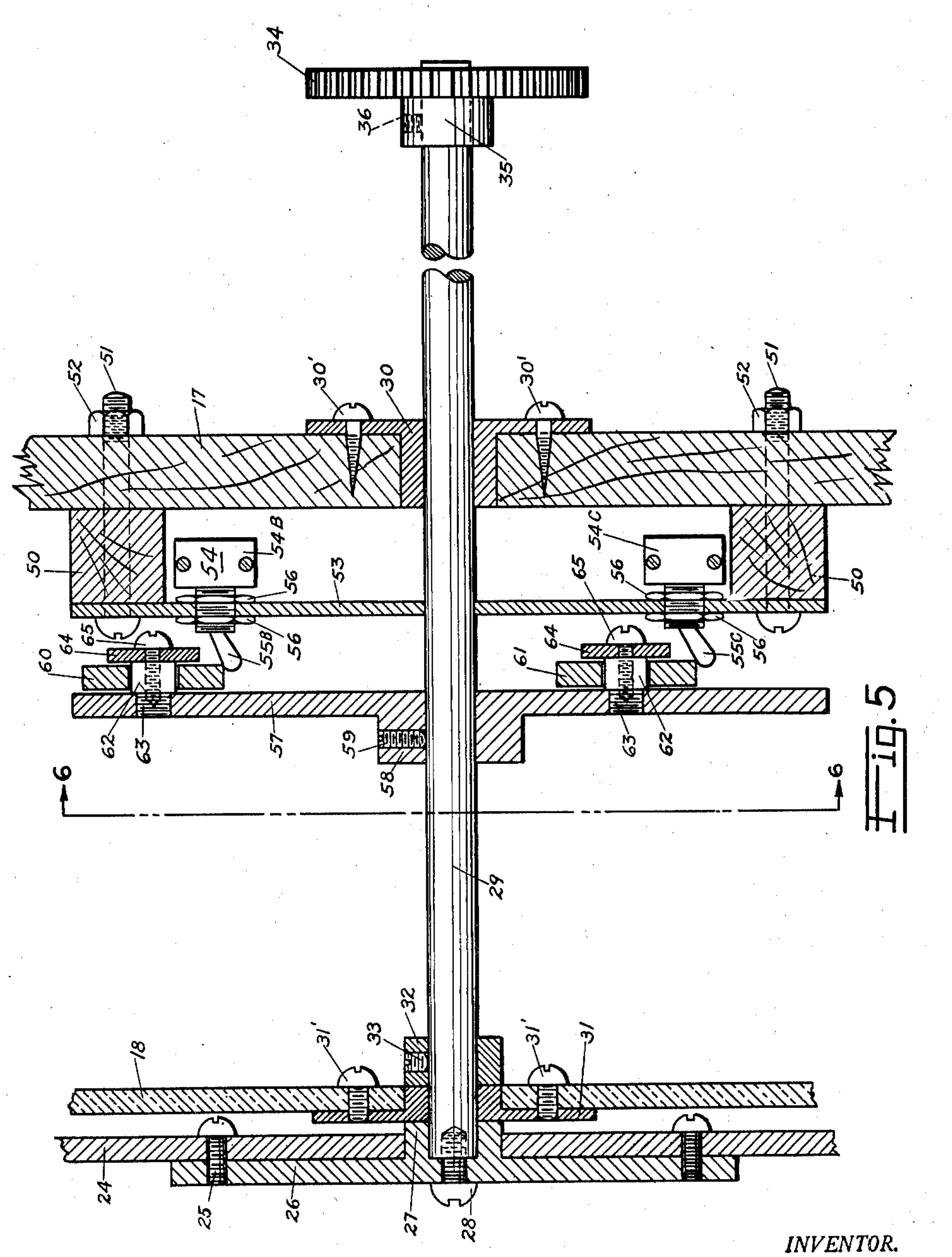
Fig. 5 is an enlarged view in section showing the switching arrangement for controlling the color of lights.

Mounted for rotation in front of cover-plate 18 (Fig. 5) is a disc 24 of Bakelite or other opaque material, which is secured by screws 25 to a support disc 26 having a hub 27 adapted to be held by a screw 28 to one end of a shaft 29. Shaft 29 is mounted for rotation in box 12 and is supported adjacent its rear end by a bearing 30, which is secured to back-reinforcing member 17 by screws 30', and at its other end is supported by a bearing 31, which is secured to cover-plate 18 by screws 31'. A thrust collar 32, secured to shaft 29 by set-screw 33, in combination with hub 27 of support disc 26 prevents lateral displacement of shaft 29 relative to cover-plate 18 of box 12. Mounted upon shaft 29 at the rear extremity thereof is a sprocket wheel 34 having an integral hub 35, which is locked to shaft 29 by set-screw 36.

Rotary disc 24 is designed to represent the two-pole rotor of a multiphase alternating-current generator while cover-plate 18 is designed to represent the stator of such a generator. Symbols representing electrical windings 37 (see Fig. 1) are painted or otherwise depicted on opaque rotor 24 and positive and negative symbols at the ends of windings 37 represent relative direction of current flow therein. Symbols representing magnetic lines of force are shown visually at 38. To simplify the illustration, a north magnetic pole is indicated by the letter N and a south magnetic pole is indicated by the letter S. Windings 37 and magnetic lines of force 38 afford a visual simulation of the electrical and magnetic conditions that prevail in the two-pole rotor of a generator designed to be excited by direct current.

Preferably, transparent cover-plate 18 is painted with opaque material such as black paint except for symbols representing electrical windings 39, which are designed to represent three-phase windings and which, because of their transparency, can be illuminated by lights located within box 12 and hereinafter described. Windings 39 are arranged to represent the three individual phase windings of a generator and the individual phase windings are indicated at 40A, 40B and 40C. Windings 40A', 40B' and 40C' are located opposite windings 40A, 40B and 40C respectively. In operation, when the north pole of the rotor is passing winding 40A, the south pole of the rotor is passing winding 40A', thus simulating conditions whereby voltage of opposite polarity is inducted in the two windings of an actual generator. In order that the voltages may be additive, windings 40A and 40A' are joined together in series with reverse connections by a represented conductor 41. The 40B and 40B' and also 40C and 40C' windings of each of the other two phases are likewise connected together in reverse. It is then seen that each pair of windings (40A and 40A', 40B and 40B', and 40C and 40C') represents one complete phase winding. The free ends of windings 40A, 40B and 40C represent the three phase leads from the generator, as indicated by legends inscribed on cover-plate 18, while the free ends of windings 40A', 40B' and 40C' are connected together to a common represented conductor 42 to illustrate the standard WYE connection.

Figure 4:
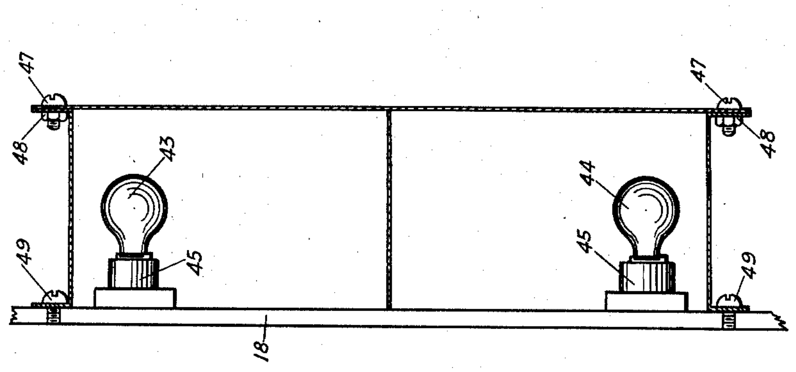
Fig. 4 is an enlarged sectional view along line 4—4 of Fig. 3.
Figure 3:
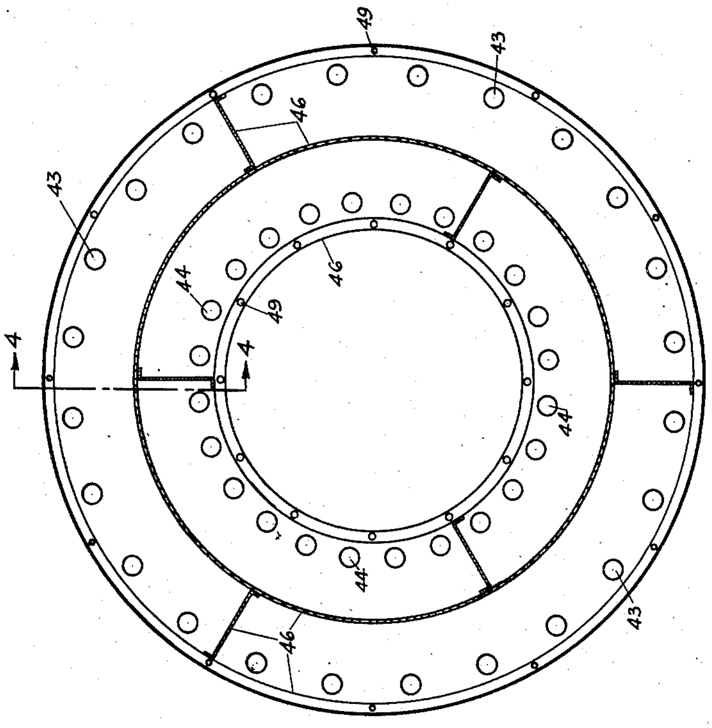
Fig. 3 is a front elevational view with the cover removed of the construction shown in Fig. 1, illustrating the arrangement of lights and compartments therefor.

Phase windings 40A, 40B and 40C are adapted for illumination by three sets of lights 43 (Figs. 3 and 4) located within box 12, while windings 40A', 40B' and 40C' are adapted for illumination by three additional sets of lights 44 located within box 12. Alternate lights in each of rings 43 and 44 are red, while the lights in between are green. The two colors are used to indicate the relative polarity of simulated induced voltage in windings 39. In a manner hereinafter described, the red and green lights are arranged to be illuminated independently. The lights are mounted in individual sockets 45 secured to the inside of cover-plate 18. The inside of cover-plate 18 is divided into compartments by means of partitions 46, which are so designed that a separate compartment is formed behind each of the windings 40A, 40B, 40C, 40A', 40B' and 40C'. Partitions 46 are secured together by welding, the back is secured by means of screws 47 and nuts 48, and the whole assembly is secured to the rear of cover-plate 18 by screws 49. The electrical connections for illuminating lights 43 and 44 will be hereinafter described.

Figure 6:
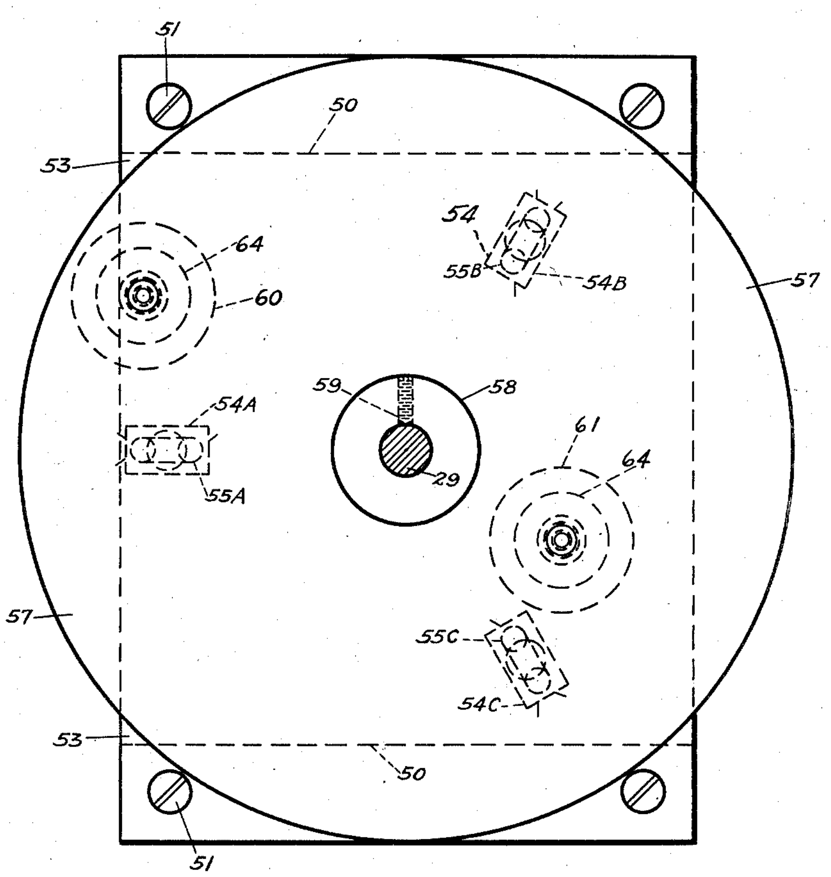
Fig. 6 is a view approximately along line 6—6 of Fig. 5.
Figure 7:
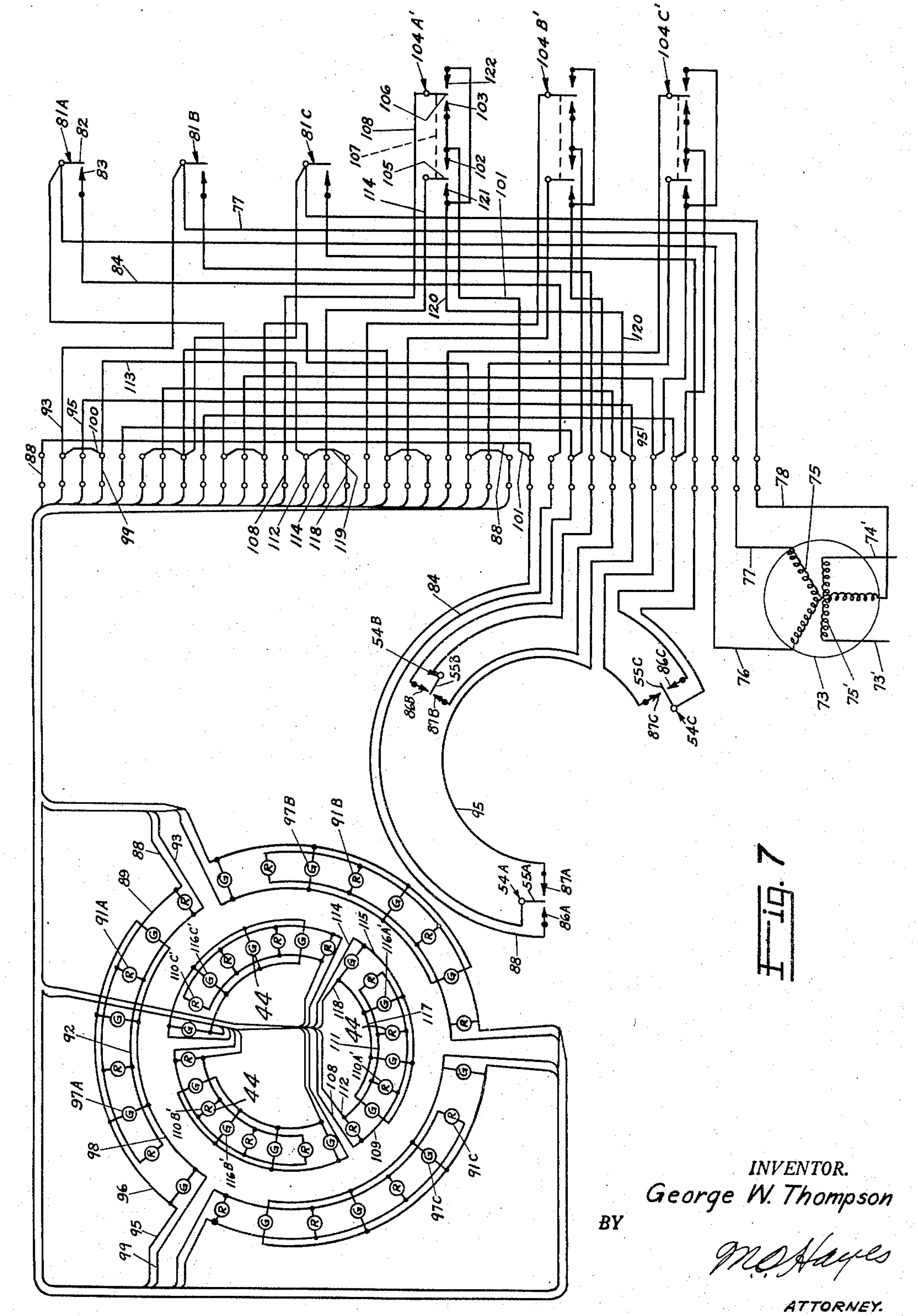
Fig. 7 is an electrical wiring diagram for the mock generator.

In order that the phase windings may be illuminated in synchronization with movement of rotor 24, sequence switches 54 (Figs. 5 and 6) are arranged as follows: Mounted upon the inside of back reinforcing member 17 is a pair of parallel horizontal wooden blocks 50, which are secured in place by means of bolts 51 and nuts 52. Mounted on blocks 50 in spaced relation from back-reinforcing member 17 is a supporting plate 53, which can be formed of metal or any other suitable material. Mounted upon plate 53 are three individual selector switches 54A, 54B and 54C which control alternatively selection of either red or green light illumination to show relative polarity of voltage induced in windings 40A, 40B, 40C and 40A', 40B', 40C' respectively. Switches 54A, 54B and 54C are spaced in 120° angular relation, and are provided with toggle blades 55A, 55B and 55C respectively, as well as contacts 86A, 87A, 86B, 87B, 86C and 87C respectively (Fig. 7). Switches 54A, 54B and 54C are secured to plate 53 by means of locknuts 56.

Mounted for rotation with shaft 29 is a disc-plate 57 having a hub 58 secured rigidly to shaft 29 by set-screw 59. Roller 60 and 61 are mounted upon disc 57 facing plate 53. Each of rollers 60 and 61 is supported for rotation upon a stud 62, which is threaded into plate 57 at 63. A thrust washer 64 secured to stud 62 by a screw 65 retains each of rollers 60 and 61 in place. Rollers 60 and 61 are disposed 180° apart upon disc 57 and roller 60 is disposed at a greater radial distance from shaft 29 than is roller 61. Roller 60 is located so that as it passes switch 54A it trips switch toggle-blade 55A thereof inwardly toward shaft 29, while movement of roller 61 past switch 54A causes tripping of switch toggle-blade 55A thereof outwardly. Switches 54B and 54C are activated similarly by rollers 60 and 61. Electrical connections for switches 54A, 54B and 54C will be hereinafter described in connection with Fig. 7.

A hand wheel 66 (Figs. 1 and 2) provided with a crank handle 67 is mounted in a lower corner of cover-plate 18 for rotation of a shaft 68. Shaft 68 is supported adjacent one end for rotation relative to cover-plate 18 by bushing 69 and is supported adjacent its other end for rotation relative to rear plate 16 by means of bushing 71. A sprocket wheel 72 is secured to the rear extremity of shaft 68.

Mounted upon bottom plate 14 in one corner of box 12 is a Selsyn transmitter 73 of conventional type, said transmitter having a rearwardly-extending rotor shaft 74 upon which is mounted a sprocket wheel 75. Sprocket wheels 75, 72 and 34 are coupled by a sprocket chain 76. Rotation of hand wheel 66 thus causes rotation of disc 24 and Selsyn transmitter rotor shaft 74. Disc 24 and Selsyn transmitter rotor shaft 74 are geared together in 1-1 ratio. Electrical connections which will now be described cause represented phase windings 39 on cover-plate 18 to be illuminated by the action of Selsyn transmitter 73 in synchronization with rotation of disc 24.

Selsyn transmitter 73 is provided with a two-pole rotor having winding 75' and is provided with a stator having three phase windings 75 (see Fig. 7). Rotor winding 75' is excited by alternating current from any suitable source (not shown) through conductors 73' and 74'. Stator phase windings 75 are connected together in the conventional Y arrangement. Selsyn transmitter 73 operates in effect as a transformer, with rotor winding 75' serving as a primary and stator windings 75 serving as secondaries. The voltage induced in the individual stator windings 75 and impressed across leads 76, 77 and 78 varies with the rotational position of rotor winding 75'. Leads 76, 77 and 78 connect the Selsyn transmitter into the mock generator electrical circuit in such maner that lights 43 and 44 (Figs. 1 and 2) illuminate the individual represented phase windings 39 with an intensity that varies with the synchronized rotational position of disc 24 and Selsyn transmitter 73.

Figure 1:
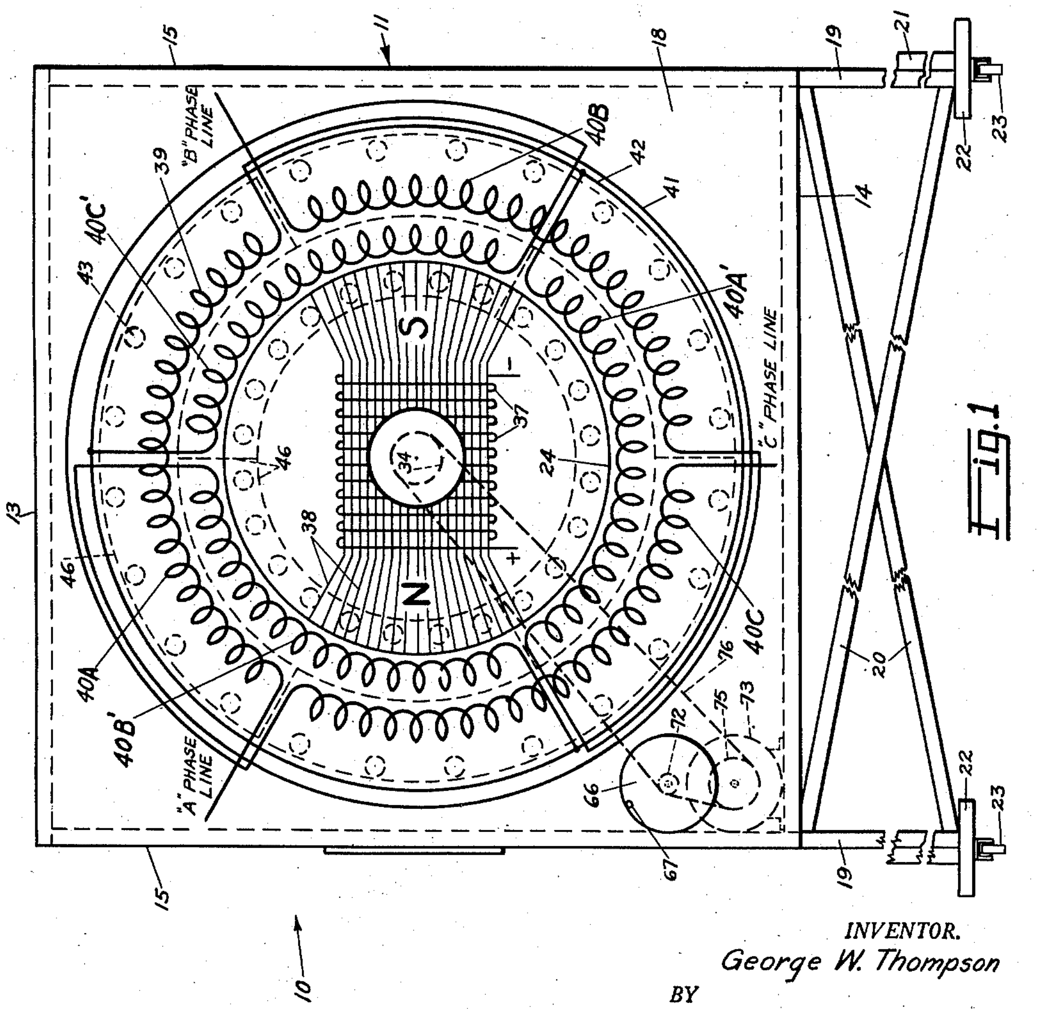

The electrical connections by which Selsyn transmitter 73 (Fig.7) illuminates winding 40A with either red or green light will now be described. Conductor 76 leads from Selsyn transmitter 73 to master switch 81A, which controls illumination of winding 40A and which has a blade 82 and a contact 83. Contact 83 is connected by conductor 84 to selector switch 54A having toggle blade 55A and contacts 86A and 87A. Contact 86A is connected by conductor 88 to a feeder line 89 for a set of red lights 91A, which serve to illuminate winding 40A (Fig. 1)

and form part of the ring of lights 43. A return line 92 is connected by means of a conductor 93 to master switch 81B, which also serves as a terminal for Selsyn transmitter conductor 77. Thus it will be seen that, with master switch 81A closed and with selector switch 54A closed against contact 86A, a circuit is provided whereby Selsyn transmitter 73 illuminates red lights 91A to afford red illumination of winding 40A.

Contact 87A of switch 54A is connected by conductor 95 to a feeder line 96, and through a set of green lights 97A, which serve to illuminate winding 40A, to a return line 98, conductor 99 and cross wire 100 to line 93, thence to master switch 81B, to which Selsyn-transmitter conductor 77 is connected. It will thus be seen that, with master switch 81A closed and with switch 54A closed against contact 87A, a circuit is provided whereby Selsyn transmitter 73 illuminates green lights 97A to afford green illumination of winding 40A.

The electrical connections by which Selsyn transmitter 73 illuminates winding 40A′ with either red or green light will now be described. Conductor 88 from switch 54A is connected by a conductor 101 with contacts 102 and 103 of a manual selector-switch 104A′, which controls illumination of winding 40A′. Switch 104A′ is provided with toggle-blades 105 and 106, which are locked mechanically for movement together by a tie-rod 107. Blade 106 is connected by a conductor 108 to a feeder line 109 for a set of red lights 110A′, which serve to illuminate winding 40A′ and form part of the ring of lights 44. A return line 111 is connected by a conductor 112, cross-line 113, cross-line 100 and conductor 93 to master switch 81B. Blade 105 of switch 104A′ is connected by a conductor 114 to a feeder line 115 for a set of green lights 116A′, which serve to illuminate winding 40A′. A return line 117 is connected by a conductor 118 and cross-line 119, cross-line 113, cross-line 100 and conductor 93 to master switch 81B. Conductor 95 from switch 54A is connected by a conductor 120 to contacts 121 and 122 of switch 104A′.

It will be seen that if master switch 81A is closed and switch 54A is closed against contact 86A thereof to provide red light illumination of winding 40A, then manual selector switch 104A′ can be closed with blade 106 against contact 103 to provide red light illumination of simulated winding 40A′ through the circuits just described, so that windings 40A and 40A′ are both illuminated with red lights. On the other hand, if manual selector switch 104A′ is closed with blade 105 against contact 102, then green light illumination is provided for winding 40A′ through the circuits just described, and windings 40A and 40A′ are illuminated with lights of contrasting color.

It will also be seen that if master switch 81A is closed and switch 54A is closed against contact 87A thereof to provide green light illumination of winding 40A, then switch 104A′ can be closed with blade 105 against contact 121 to provide green light illumination of winding 40A′ so that windings 40A and 40A′ are both illuminated with green lights. On the other hand, if switch 104A′ is closed with blade 106 against contact 122, then red light illumination is provided for winding 40A′, and windings 40A and 40A′ are illuminated with lights of contrasting color.

The electrical system for providing red and green light illumination for windings 40A and 40A′, which constitute the A phase portion of winding 39 represented on cover-plate 18 (Fig. 1) have been described in detail. Similar electrical systems are provided, as shown in Fig. 7, for illuminating the B phase portions of winding 39 and include master switch 81B, switch 54B having toggle-blade 55B and contacts 86B and 87B, switch 104B′, red lights 91B and 110B′, and green lights 97B and 116B′ for controlling B phase illumination. Further included are master switch 81C, switch 54C having toggle-blade 55C and contacts 86C and 87C, switch 104C′, red lights 91C and 110C′ and green lights 97C and 116C′ for controlling C phase illumination. Electrical connections for the B and C phase are similar to connections for the A phase and are illustrated in detail in Fig. 7.

Operation of the device is as follows: The training aid is conditioned for operation by connecting Selsyn-transmitter winding 75′ to a suitable source of alternating current by means of conductors 73′ and 74′.

The operator, in giving a demonstration, can then explain preliminarily the phenomenon of induction that occurs when there is relative motion between a magnetic field and a conductor that cuts the lines of force of the field, and can point out that the simulation of windings of the stator, represented by windings 39, correspond to the conductor, while the lines of force 38 on rotor 24 correspond to the magnetic field having a north pole N and a south pole S. It can be explained that the magnitude of the electrical effect induced in stator windings 39 depends upon the number of turns or loops in windings 39, the number of lines of force in magnetic field 38, and the rate of relative movement or rotation of rotor 24. It should be emphasized that in an actual generator rotation of the rotor must occur in order to induce an electrical effect, but that the training aid, for purposes of illustration, is arranged so that even with rotor 24 arrested in a particular position, windings 39 indicate an induced effect so that instant conditions can be demonstrated. Attention can also be invited to the fact that rotor windings 37 of an actual generator are connected to a source of direct current, as indicated by the + and − symbols on rotor 24.

Rotor 24 is now positioned as shown in Fig. 1, with the north pole to the left, and master switch 81A is closed to condition windings 40A for illumination. Rotor 24 is then rotated clockwise through 180° to simulate actual operating conditions, and the operator can call attention to the fact that, just as represented magnetic field 38 sweeps windings 40A, the magnetic field of an actual generator induces a voltage in its windings. The intensity of the voltage varies from zero at the start of the sweep to a maximum when the north pole is positioned vertically and decreases to zero at the end of the sweep because of the fact that the number of magnetic lines of force 38 that cut winding 40A vary from zero to a maximum and back to zero again. During the sweep a visual representation of the induced effect is provided by red light illumination of winding 40A, and the intensity of the illumination varies from zero at the start of the sweep to a maximum and back again to zero at the end of the sweep. It can be explained by the operator that the variation of intensity in illumination is an indication of variation in intensity of the induced electrical voltage and that color of the illumination indicates the polarity of the induced effect, red illumination indicating polarity induced when the rotor north pole sweeps a stator winding and green illumination indicating opposite polarity induced when the rotor south pole sweeps a stator winding.

The red light illumination during the 180° sweep is provided by the following operation of the training aid: As described, master switch 81A was closed manually. Switch 54A is closed against contact 86A at the beginning of the sweep by movement of roller 61 past the switch to complete the circuit including red lights 91A adapted for illumination of winding 40A. Rotation of rotor 24 through a 180° sweep causes synchronized rotation of Selsyn-transmitter rotor-winding 75', whereby the voltage across Selsyn-transmitter lines 76 and 77 is varied from zero to a maximum and back to zero to vary the intensity of illumination of red lights 91A.

The demonstration can be continued by rotating rotor 24 through an additional 180° sweep to complete one revolution. During this sweep the rotor south pole sweeps winding 40A and the winding is illuminated with green light representing the polarity of the induced voltage. The operator can call attention to the contrast in color of illumination between red and green corresponding to the contrast in polarity of induced effect when winding 40A is swept by a north magnetic pole and a south magnetic pole. Green light illumination of winding 40A is provided since, at the start of the second 180° sweep, switch 54A is closed against contact 87A by roller 60 to complete the circuit including green lights 97A. As previously described, rotation of Selsyn-transmitter rotor-winding 75' causes variation of intensity of the illumination of winding 40A, and illustrates variation of intensity in the voltage induced in an actual winding corresponding to winding 40A.

Starting again with the north pole of rotor 24 to the left as shown in Fig. 1 and master switch 81A closed, the operator can close switch 104A' with blade 106 against contact 122, and rotor 24 can then be rotated clockwise through 180°. During the rotation, winding 40A is illuminated by red light corresponding to sweep of the rotor north pole and winding 40A' is illuminated by green light corresponding to the sweep of the rotor south pole, intensity of illumination varying from zero at the start of the sweep to a maximum and back to zero again at the end of the sweep. The operator can point out that the electrical effects induced in actual windings corresponding to windings 40A and 40A' are of opposite polarity as indicated by the contrasting color of light illumination, and that in order to connect the two windings so that the effect is additive, it is necessary to connect them in series but with the windings in reversed relation to each other, as shown by conductor 41 on cover-plate 18. The demonstration can then be continued by rotating the training-aid rotor through another 180° to complete the revolution. During the second 180° of rotation, winding 40A is illuminated with green light corresponding to the sweep of the rotor south pole and winding 40A' is illuminated with red light corresponding to sweep of the rotor north pole. Switch 54A is closed against contact 86A by roller 61 at the start of the rotor north pole sweep past winding 40A and is closed against contact 87A by roller 60 at the start of the rotor south pole sweep past winding 40A.

Ordinarily, for purposes of demonstration, switch 104A' is closed with blades 105 and 106 against contacts 102 and 122 respectively as described above, whereby windings 40A and 40A' are illuminated with light of contrasting color to indicate that voltage of contrasting polarity is being induced in the two windings. If desired for purposes of illustration, however, the color of light illumination for both winding 40A and winding 40A' can be made the same by closing switch 104A' with blades 105 and 106 against contacts 121 and 103 respectively.

Illumination of phase windings 40B and 40B' can be controlled likewise through master switch 81B and switch 104B' and illumination of phase windings 40C and 40C' can be controlled through master switch 81C and switch 104C'.

The various phase windings can be illuminated individually as described, or, if desired, all of the windings or any combination of windings can be illuminated together by proper operation of switches 81A, 81B, 81C and 104A', 104B' and 104C'.

Instant conditions within the windings of an actual generator can be illustrated by arresting rotor 24. In this manner, the instant polarity and intensity of induced electrical voltage in each winding are indicated by the color and intensity of light illumination of such winding, and the instant relation between the various windings is shown.

On the other hand, the progressively changing conditions encountered in rotation of an actual generator can be illustrated if rotor 24 is turned; the conditions in each winding and the sequence of relations between the various windings can be shown.

While each winding has been described as having two sets of individually colored lights for indicating polarity, it is understood that the construction can be modified to use any desired number of differently colored sets of lights for indicating polarity or other characteristics of the induced electrical effect and that suitable colors other than red and green can be used. A further modification can be made by using variation in the intensity of illumination to illustrate variation in characteristics of the induced effect other than magnitude of induced voltage.

An alternative embodiment of the invention shown in Figs. 8 to 16 inclusive embodies a mock motor 129 of the four-pole type constructed so that it can be used to simulate either a synchronous-type alternating-current motor or an induction-type alternating-current motor.

Figure 9:
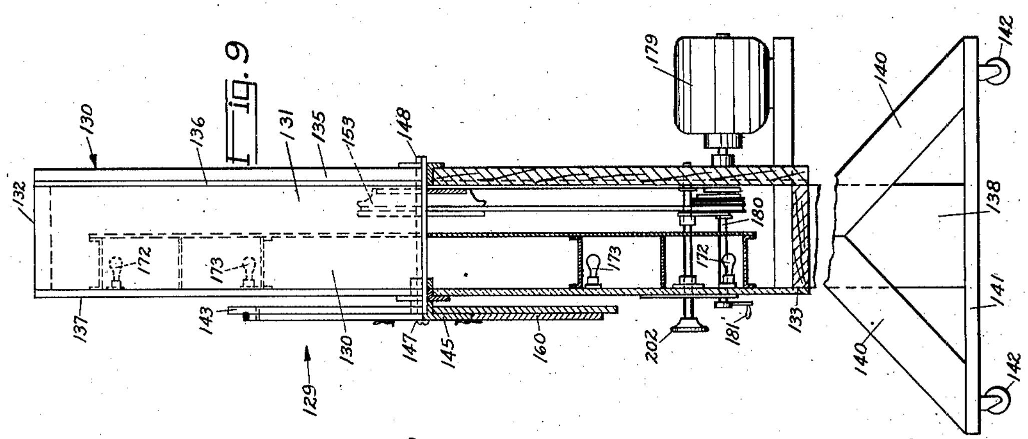
Fig. 9 is a side view partly in section and partly in elevation of the construction shown in Fig. 8.
Figure 8:
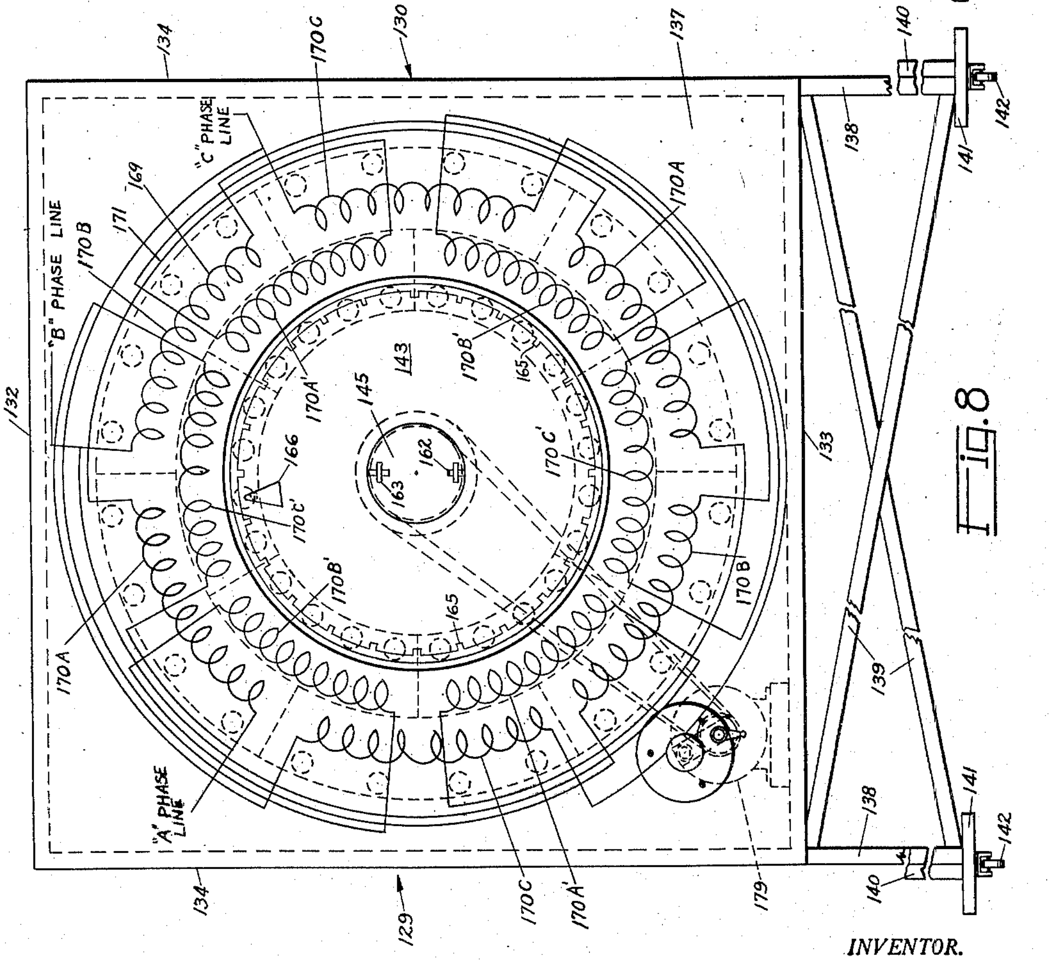
Fig. 8 is a front elevational view of a further embodiment of the invention showing a mock multiphase motor.
Figures 10, 11, 12:
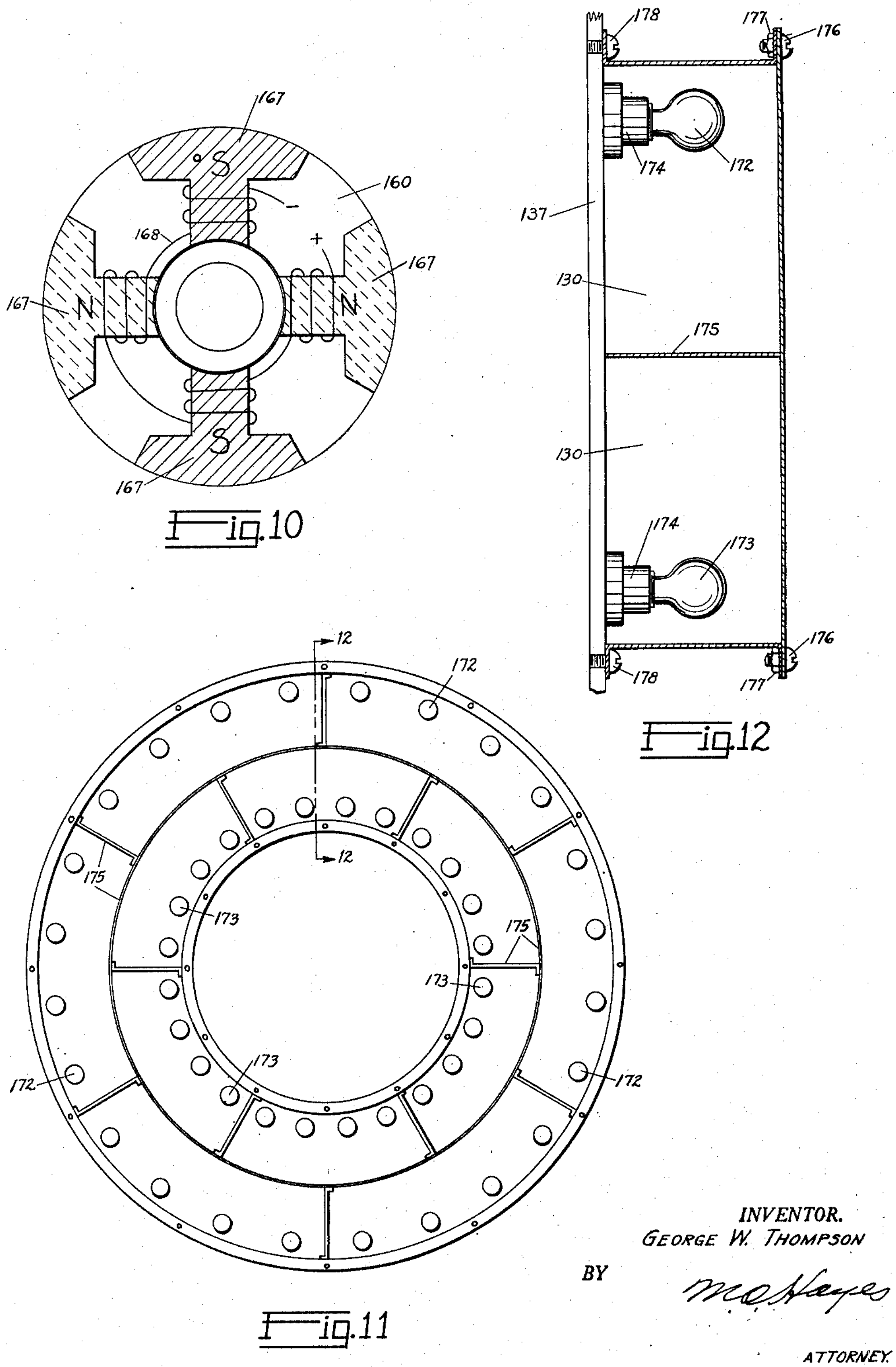
Fig. 10 is a plan view of a detachable mock synchronous rotor for use in connection with the embodiment of the invention illustrated in Figs. 8 and 9.
Fig. 11 is a front elevational view with the cover removed of the construction shown in Fig. 8 illustrating the arrangement of lights and compartments therefor.
Fig. 12 is an enlarged sectional view along the line 12—12 of Fig. 11.
Figure 13:
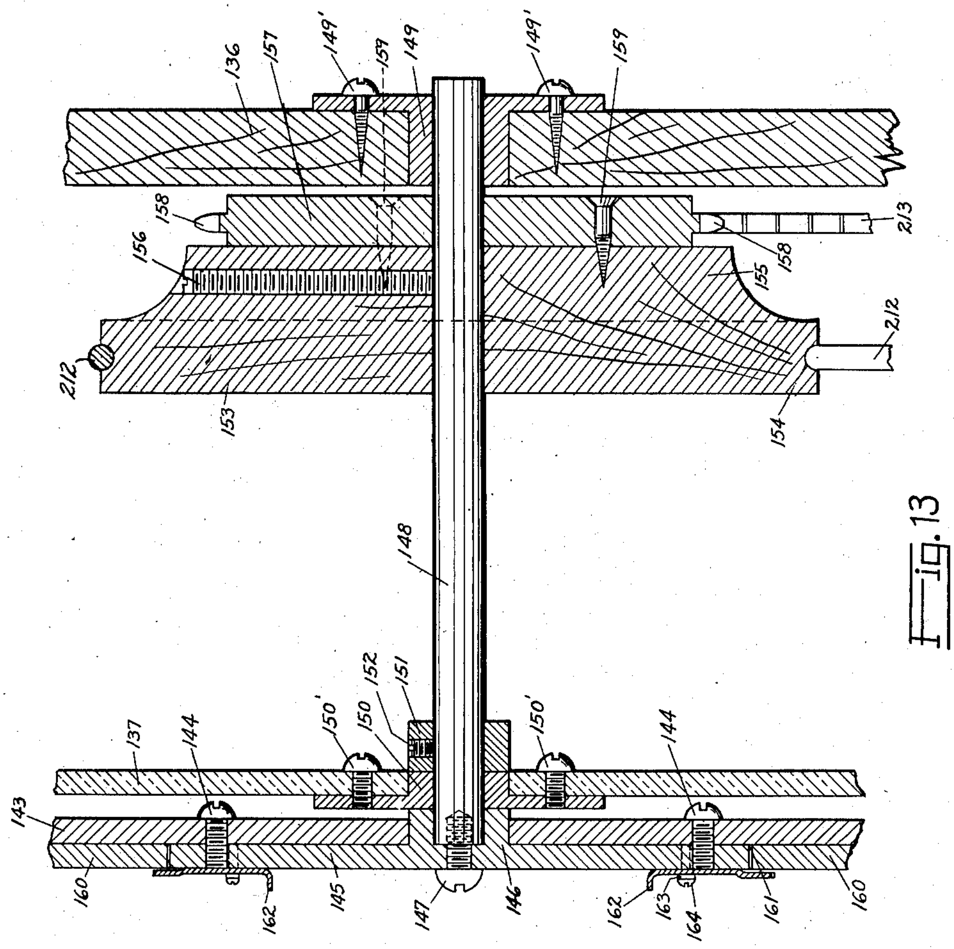
Fig. 13 is an enlarged sectional view through the main shaft showing the mounting of the rotor discs.

A frame work 130 including a box 131, having top 132, a bottom 133, sides 134 and a back 135 is provided with a vertical reinforcing member 136 (see Figs. 8 and 9). These members can be made of wood or similar material. A cover-plate 137 is formed from transparent material such as Plexiglas. Box 131 is supported upon vertical legs 138, which are reinforced by cross-braces 139, and each leg is secured by means of anchor members 140 to a platform 141 supported upon casters 142, which render the construction movable.

Mounted for rotation in front of cover-plate 137 (Fig. 13) is a disc 143 of Bakelite or other opaque material, which is secured by a screw 144 to a support disc 145 having a hub 146, which is adapted to be held by screw 147 to one end of a shaft 148. Shaft 148 is mounted for rotation in box 131 and is supported adjacent one end by a bearing 149, which is secured to back-reinforcing plate 136 by screws 149', and at its other end is supported by a bearing 150, which is secured to cover-plate 137 by screws 150'. A thrust collar 151 secured to shaft 148 by set-screw 152, in combination with hub 146 of supporting disc 145, prevents lateral displacement of shaft 148 relative to cover-plate 137 of box 131.

Mounted on shaft 148 between cover-plate 137 and back 135 is a pulley 153 having a peripheral groove 154 and a hub 155. A set-screw 156 locks pulley 153 to shaft 148 for rotation therewith. Pulley 153 can be made of wood or other suitable material. Mounted on shaft 148 in contact with the rear face of pulley 153 is a sprocket wheel 157 provided with peripheral teeth 158. Sprocket wheel 157 is locked to pulley 153 by means of screws 159, whereby both sprocket wheel 157 and pulley 153 rotate with shaft 148.

Mounted removably in front of disc 143 is a second disc 160 having a central opening 161, whereby disc 160 is fitted over support disc 145 against disc 143. Disc 160 is retained in place by sliding clips 162, each of which is mounted for radial sliding movement under a bracket 163 mounted on supporting disc 145 by means of screws 164. When clips 162 are drawn radially inward toward each other, disc 160 can be removed from supporting disc 145. When disc 160 is mounted in place, clips 162 can be moved radially outward so that the extremities thereof overlap disc 160 to lock the latter in place.

Rotary disc 143 is designed to represent the rotor of an induction motor, while cover-plate 137 is designed to represent the stator of such a motor. Symbols (Fig. 8) representing peripheral slots 165 are painted or otherwise depicted on opaque rotor 143 for indicating that the rotor is of the conventional squirrel-cage type used in induction motors. An index 166 is inscribed on the face of rotor 143 so that during demonstration the relative slippage between rotor 143 and the rotating magnetic field of the stator, which slippage is characteristic of polyphase alternating-current motors, can be shown.

Removable rotor disc 160 is designed to represent the rotor of a synchronous motor having four poles. Symbols 167 (Fig. 10) representing the poles of the rotor are inscribed on rotor 160. Symbols representing electrical windings 168 are inscribed on rotor 160 and positive and negative symbols at the ends thereof represent relative direction of current flow within rotor windings 168. To simplify the illustration, the two opposed north magnetic poles are indicated by the letter N and the two opposed south magnetic poles are indicated by the letter S. Windings 168 and the pole symbols afford a visual indication of the electrical and magnetic conditions that prevail in the four pole rotor of a motor of the synchronous type.

Preferably, transparent cover-plate 137 is painted with opaque material such as black paint, except for symbols representing electrical windings 169, which are designed to represent multiphase windings and which because of their transparency, can be illuminated by lights located within box 130 as hereinafter described. Windings 169 are arranged to simulate the three-phase windings of a four-pole alternating-current motor, and the individual phase windings are indicated at 170A, 170B and 170C. Since the motor is illustrated as being of the four-pole type, it will be seen that there are two opposed windings in each of the phases 170A, 170B and 170C. In operation, when a north pole of the synchronous rotor is passing by winding 170A, a south pole of the rotor is passing by another winding spaced 90° therefrom, indicated at 170A', to represent conditions whereby field voltages of opposite polarity are impressed upon the rotor pole windings of an actual motor. Similar windings 170B' and 170C' are indicated. The two 170A windings and the two 170A' windings are represented as being connected together in series with the 170A' windings in reverse relation by conductors 171 (see Fig. 8). The 170B and 170B' windings and also the 170C and 170C' windings of each of the other two phases are represented as similarly connected. The windings of the three phases are represented as connected together in a manner conventional in actual motors of this type (see Fig. 8).

The three-phase windings 170A, 170B and 170C are adapted for illumination by a ring of lights 172 located within box 130, while windings 170A', 170B' and 170C' are adapted for illumination by a ring of lights 173 located within box 130. Alternate lights in each of rings 172 and 173 are red, while the lights in between are green. The two colors are used to indicate the relative polarity of simulated induced voltage in windings 169. In a manner hereinafter described, red and green lights are arranged to be illuminated independently. The lights are mounted in individual sockets 174 secured to the inside of cover-plate 137. The inside of cover-plate 137 is divided into individual compartments by means of partitions 175, which are so designed that a separate compartment is formed behind each of the windings 170A, 170B, 170C, 170A', 170B' and 170C'. Partitions 175 are secured together by welding, the back secured by means of screws 176 and nuts 177, and the whole assembly secured to the rear of cover-plate 137 by screws 178. The electrical connections for illuminating lights 172 and 173 will be hereinafter described.

Mounted upon bottom plate 133 in one corner of box 130 is a Selsyn transmitter 179 (Figs. 9 and 14) of conventional type, which has a forwardly extending rotor-shaft 180 supported by means of a bushing 180' mounted in cover-plate 137 and provided with a handle 181'. Mounted forwardly of Selsyn transmitter 179 is a clutch 182' which will now be described.

The forward end of shaft 180 extends through an opening 183 in back plate 135. Mounted upon shaft 180 is a driving disc 184 provided with a set-screw 185 for locking the disc for rotation with shaft 180. Driving disc 184 is provided with a forward friction face 186 and with a slot 187. Mounted to the rear of driving disc 184 upon shaft 180 for rotation relative to shaft 180 is a sprocket-wheel 188 having peripheral teeth 189. Mounted in sprocket-wheel 188 is a pin 191 having a forwardly extending projection 192 that can be aligned with slot 187 in driving disc 184. Extending rearwardly from sprocket wheel 188 is an integral collar 193 provided with a channel 194. Mounted forwardly of driving disc 184 upon shaft 180 for rotation relative thereto is a pulley 195 having a peripheral groove 196. Provided on the rear face of pulley 195 is a friction facing 197. Extending forwardly from pulley 195 is a collar 198 provided with a channel 199.

Located above shaft 180 and parallel thereto is a clutch-shifting rod 201 provided with a knob 202 for manual manipulation. Rod 201 is supported at its forward end in cover-plate 137 by means of a bushing 203. Rod 201 is mounted so that manual reciprocation thereof can be effected. Mounted upon rod 201 in proximity to pulley 195 is a shifting fork 204 having a bifurcated portion 205 adapted to seat within channel 199 of pulley collar 198. Shifting fork 204 is provided with an integral hub 206, which is locked to rod 201 by means of a set-screw 207. Mounted upon rod 201 in proximity to sprocket wheel 188 is a shifting fork 208 provided with a bifurcated extremity 209 adapted to seat within channel 194 of sprocket-wheel hub 193. Shifting fork 208 is provided with an integral hub 210, which is locked to rod 201 by means of a set-screw 211.

A driving belt 212 (Fig. 13) connects pulley wheel 153 mounted on shaft 148 and pulley wheel 195 mounted on shaft 180. A link chain 213 interconnects sprocket-wheel 157 mounted on shaft 148 and sprocket-wheel 188 mounted on shaft 180. The circumference of pulley wheel 153 is 2¼ times that of pulley wheel 195, while the circumference of sprocket wheel 157 is twice the circumference of sprocket wheel 188. The manner in which clutch 182' may be operated to transmit drive from shaft 180 to shaft 148 will now be described.

Figure 14:
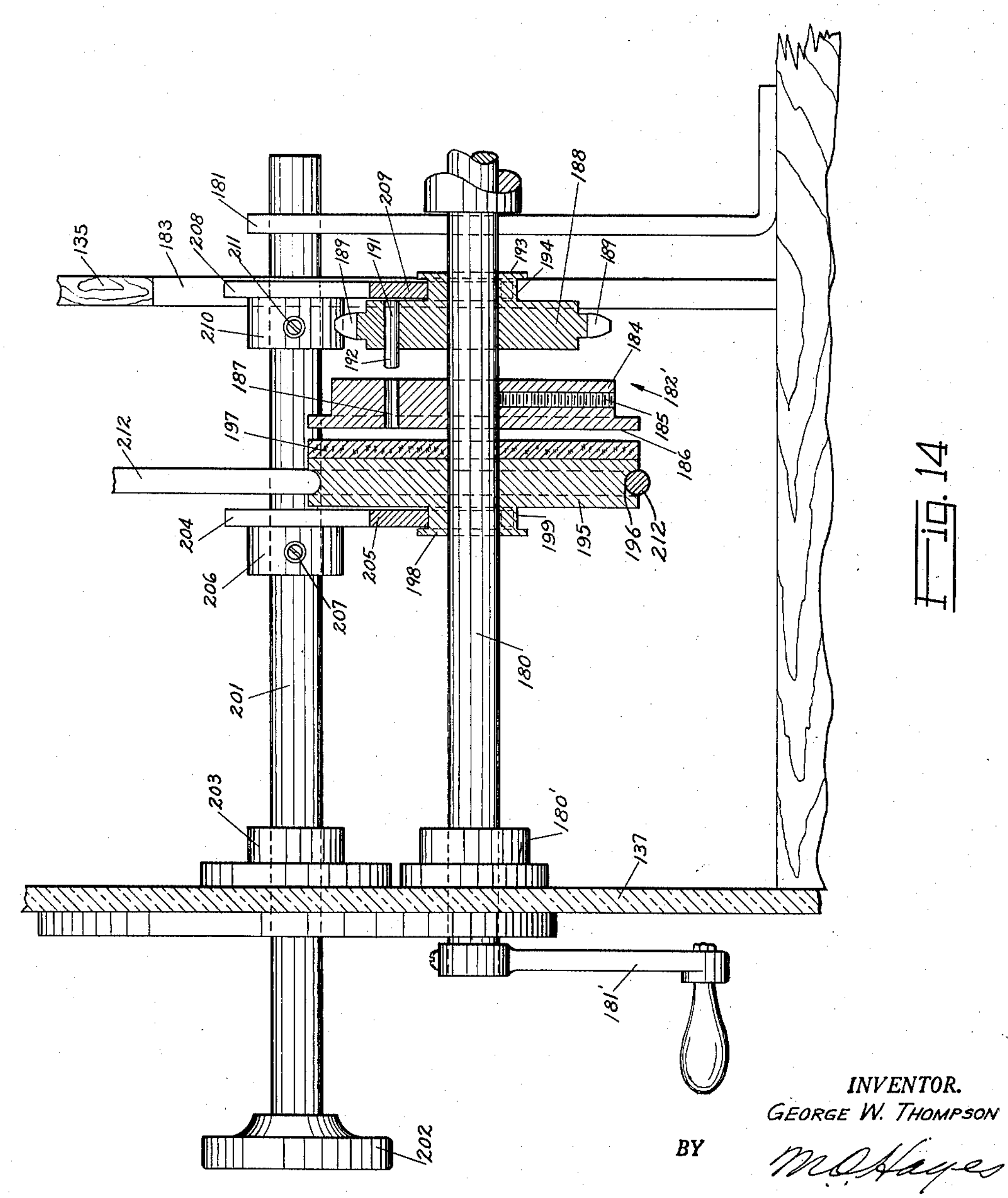
Fig. 14 is an enlarged sectional view showing the clutching arrangement used in connection with the Selsyn transmitter.

With the parts of clutch 182' in the position shown in Fig. 14, it will be seen that rotation of shaft 180 rotates driving disc 184 while pulley 195 and sprocket-wheel 188 are idling on shaft 180. Under these conditions shaft 148 does not rotate. If rod 201 is reciprocated to the right as seen in Fig. 14, shifting fork 204 moves pulley 195 to the right until friction face 197 thereof is in engagement with friction face 186 of driving disc 184. Under these conditions pulley 195 is brought gradually from idling up to the speed of driving disc 184 and shaft 180. By means of belt 212, pulley 153 and shaft 148 are brought gradually to a rotational speed of 1/2.25 the speed of shaft 180. Under these conditions, sprocket-wheel 157, which is mounted for rotation with pulley 155, is rotated, and through chain drive 213 rotates sprocket-wheel 188, thereby simulating operation of an induction motor.

To simulate conditions of operation of a synchronous motor, rod 201 is moved to the left as seen in Fig. 14, so that pin 192 of sprocket-wheel 188 engages in slot 187 of driving disc 184 to lock sprocket-wheel 188 and driving disc 184 together for rotation. Sprocket-wheel 188 then rotates at the same speed as driving disc 184, and by means of link chain 213 causes sprocket-wheel 157 and shaft 148 to rotate at a speed of 1/2.0 the speed of shaft 180.

The ratio of rotational speeds of shaft 180, which carries the rotor of Selsyn transmitter 179, and shaft 148, which carries synchronous disc 160, is 1:2 when demonstrating a synchronous motor, since disc 160 simulates a four-pole rotor and therefore rotates at one-half the apparent speed of the electrical field that is energized by Selsyn 179. In demonstrating an induction motor, the ratio of rotational speeds of shaft 180 and shaft 148 is 2.25:1 since induction disc 143 rotates at a speed to indicate slippage between disc 143 and the simulated rotating electrical field.

Selsyn transmitter 179 is provided with a two-pole rotor having a winding 214 that is connected by means of conductors 215 and 216 through a detachable connection-jack 216' to conductors 73' and 74' respectively, of rotor winding 74, in Selsyn transmitter 73. Selsyn transmitter 179 is further provided with stator phase windings 217, 218 and 219. Stator winding 217 is connected by a conductor 220 through jack 216' to conductor 76 of Selsyn transmitter 73. Stator winding 218 is connected by a conductor 221 to toggle blade 222 of double-pole double-throw switch 223. Stator winding 219 is connected by conductor 224 to blade 225 of switch 223. Contacts 226, 227, 228, and 229 are provided on switch 223. Contacts 227 and 228 are connected by a conductor 230 through jack 216' to conductor 77 of Selsyn transmitter 73 while contacts 226 and 229 are connected by a conductor 231 through jack 216' to conductor 78 from Selsyn transmitter 73. Blades 222 and 225 of switch 223 are connected together mechanically by a tie rod 232 so that movement in unison can be effected.

It will be seen that when blades 222 and 225 are thrown to the right against contacts 227 and 229 respectively, Selsyn 179 is connected to Selsyn 73 so that the rotors of the two Selsyns rotate in the same direction. If blades 222 and 225 of switch 223 are thrown to the left against contacts 226 and 228, connections from Selsyn 73 to stator windings 218 and 219 are reversed so that the direction of rotation of the rotors of Selsyns 73 and 179 is opposite.

The circuit for illuminating the red lights of windings 170A and the green lights of windings 170A' will now be described. A conductor 233 is connected at one end through jack 216' to contact 86A of switch 54A (Fig. 7) and at its other end is connected to contacts 234 and 235 of a double-pole double-throw switch 236. Switch 236 is provided with another pair of contacts 237 and 238 and is further provided with toggle-blades 239 and 240, which are linked mechanically by tie rod 241. Knife blade 239 is connected by means of a conductor 242 to a feed line 243 for a set of red lights 244A, which serve to illuminate winding 170A, and green lights 245A', which serve to illuminate winding 170A'. A return line 246 is connected by means of a conductor 247 to knife blade 222 of switch 223.

Contacts 237 and 238 of switch 236 are connected by a conductor 249 through jack 216' to contact 86B of switch 54B (Fig. 7). Blade 240 of switch 236 is connected by conductor 250 to a feed line 251 for red lights 252B, which illuminate winding 170B, and green light 253B', which illuminate winding 170B'. A return line 254 is connected through a conductor 255 to knife blade 225 of switch 223.

A conductor 259 is connected at one end through jack 216' to contact 86C of switch 54C and at its other end is connected by means of feeder line 260 to red lights 261C, which illuminate winding 170C, and green lights 262C', which illuminate winding 170C'. A return line 263 is connected through a conductor 264 to conductor 220.

A conductor 265 is connected at one end through jack 216' to contact 87A of switch 54A (Fig. 7) and at its other end is connected to contacts 266 and 267 of a double-pole double-throw switch 268. A pair of contacts 269 and 270, together with toggle-blades 271 and 272, complete the switch. A tie rod 273 links blades 271 and 272 mechanically to provide movement in unison thereof. Knife blade 271 is connected by a conductor 274 through feeder line 275 to green lights 276A, which illuminate winding 170A, and red lights 277A', which illuminate winding 170A'. A return line 278 connects to a conductor 279, which is connected to conductor 247.

Tie rods 241 of switch 236, 232 of switch 223 and 273 of switch 268 are interconnected mechanically for movement in unison by a link 248.

A conductor 279' is connected at one end through jack 216' to contact 87B of switch 54B and at its other end is connected to contacts 269 and 270 of switch 268.

Blade 272 of switch 268 is connected by a conductor 280 through a feeder line 281 to green lights 282B, which illuminate winding 170B, and red lights 283B', which illuminate winding 170B'. A return line 284 is connected through a conductor 285 to conductor 255.

A conductor 286 is connected at one end through jack 216' to contact 87C of switch 54C, and at its other end is connected through a feeder line 287 to green lights 288C, which illuminate winding 170C, and red lights 289C', which illuminate winding 170C'. A return line 290 is connected through conductor 291 to conductor 264 and conductor 220.

Figure 15:
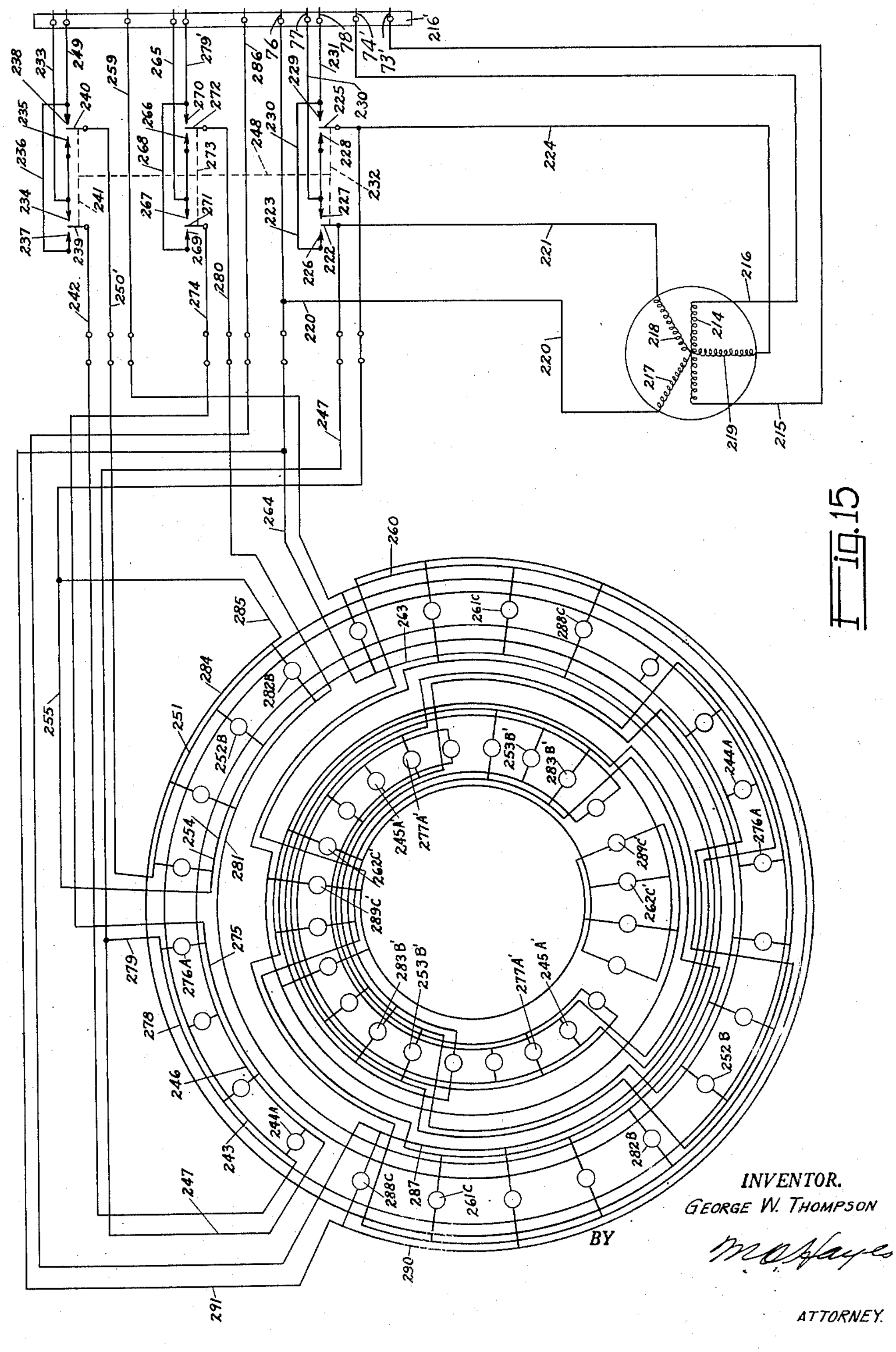
Fig. 15 is an electrical wiring diagram for the mock motor.
Figure 16:
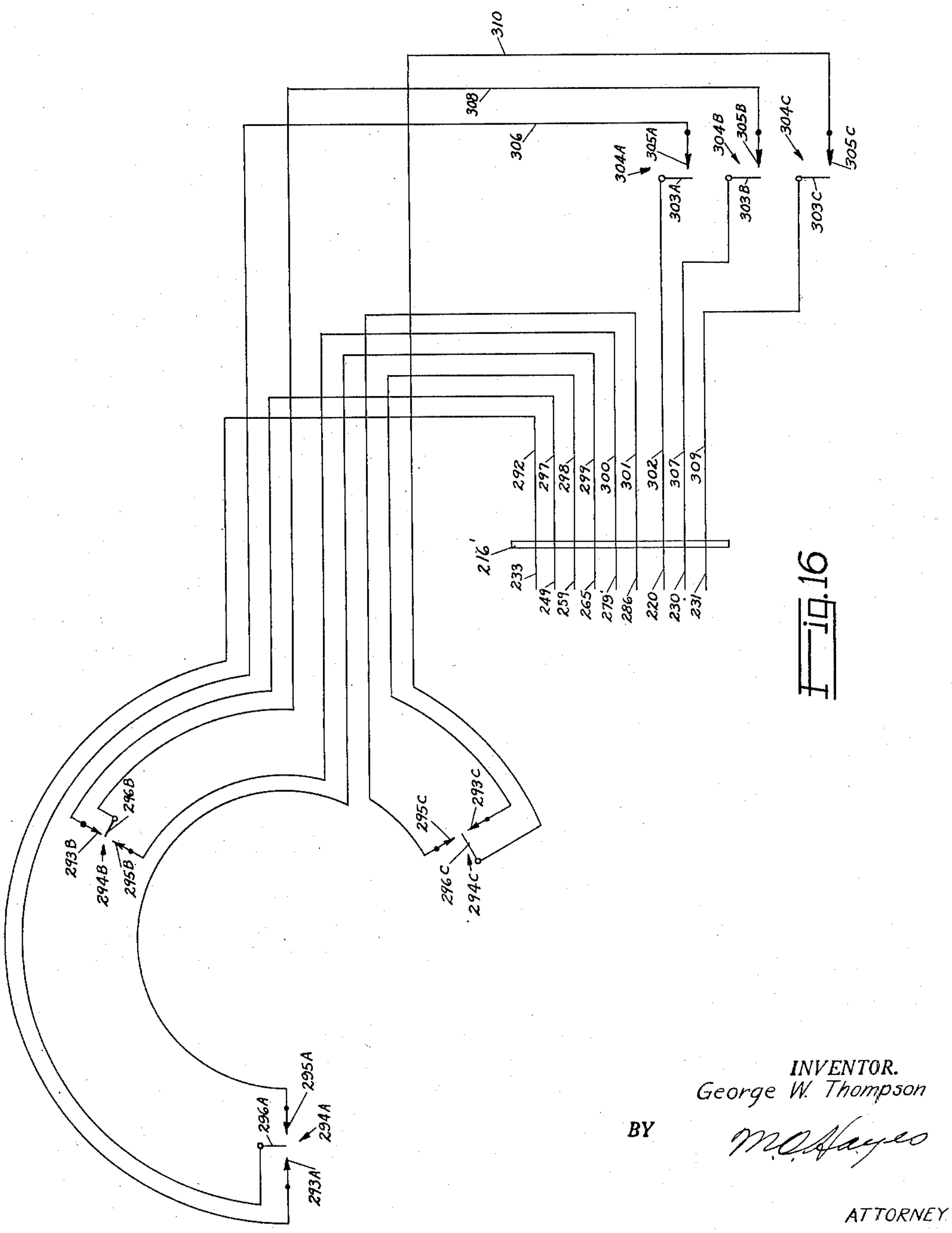
Fig. 16 is a wiring arrangement adapted for use in conjunction with the wiring arrangement shown in Fig. 15.

The wiring diagram described is designed so that by means of detachable jack 216' the circuit used for illuminating mock motor 129 is controlled through master switches 81A, 81B, 81C and selector switches 54A, 54B and 54C, which are mounted upon mock generator 10 described in connection with Figs. 1 to 7. In Fig. 16 is shown a wiring arrangement for use in connection with the lighting system disclosed in Fig. 15 whereby the lights used to illuminate mock motor 129 are controlled through master switches and selector switches mounted in association with mock motor 129 itself so that it can be operated independently of mock generator 10. Construction of the master switch and selector switches disclosed in connection with Fig. 16 is identical with those disclosed in connection with Fig. 7, and only a schematic showing thereof is made in Fig. 16.

As seen in Fig. 16, conductor 233 is connected through jack 216' to a conductor 292 and contact 293A of selector switch 294A, which has a second contact 295A and toggle-blade 296A. Conductor 249 is connected through jack 216' to a conductor 297, which is connected with contact 293B of selector switch 294B, which has a second contact 295B and a toggle-blade 296B. Conductor 259 is connected through jack 216' to a conductor 298, which is connected with a contact 293C of switch 294C, which has a second contact 295C and a toggle blade 296C.

Conductor 265 is connected through jack 216' to a conductor 299 and to contact 295A of selector switch 294A. Conductor 279' is connected through jack 216' with a conductor 300, which is connected to contact 295B of selector switch 294B. Conductor 286 is connected through jack 216' to a conductor 301, which is connected to contact 295C of switch 294C.

Conductor 220 is connected through jack 216' to conductor 302 and knife blade 303A of master switch 304A which has a contact 305A. Contact 305A is connected by means of a conductor 306 to knife blade 296A of selector switch 294A.

Conductor 230 is connected through jack 216' to a conductor 307 and knife blade 303B of master switch 304B, which has a contact 305B. Contact 305B is connected by means of a conductor 308 with toggle-blade 296B of selector switch 294B.

Conductor 231 is connected through jack 216' to a conductor 309 and toggle blade 303C of master switch 304C, which has a contact 305C. Contact 305C is connected by means of a conductor 310 with toggle-blade 296C of selector switch 294C. Conductors 215 and 216 are connected through jack 216' to any suitable source of alternating current for exciting Selsyn rotor-winding 214.

Selector switches 294A, 294B and 294C are arranged so that rotation of main shaft 148 of the simulated motor will cause actuation thereof to control illumination of the lighting arrangement disclosed in Fig. 15, and in this respect, operation of selector switches 294A, 294B and 294C is identical in operation with selector switches 54A, 54B and 54C described in connection with Fig. 7. Master switches 304A, 304B and 304C disclosed in Fig. 16 are adapted for manual operation and in this respect are identical with master switches 81A, 81B and 81C disclosed in connection with Fig. 7.

Operation of mock motor 129 will now be described. In starting a demonstration, synchronous rotor disc 160 is removed to expose induction disc 143. Clutch knob 202 (Fig. 14) is placed in neutral position so that driving disc 184 is out of contact both with pulley 195 and sprocket wheel 188, as shown in Fig. 14. Jack 216' (Fig. 15) is then connected with mock generator 10 as described previously, so that selector switches 54A, 54B and 54C, together with master switches 81A, 81B and 81C control illumination of lights 172 and 173 in mock motor 129. Wires 73' and 74' from Selsyn rotor winding 74 are connected to a suitable source of alternating current.

Energization of windings can then be demonstrated by turning handle 66 (Figs. 1 and 2) to cause rotation of Selysen rotor 74 through 90°. As red lights 244A are illuminated to maximum brilliancy, green lights 245A' are illuminated to maximum brilliancy, indicating that windings 170A and 170A' and all other windings are being energized in opposite polarity. Rotation of Selsyn rotor 74 through an additional 90° causes red lights 244A and green lights 245A' to diminish in brilliancy and to be succeeded by illumination of green lights 276A and red lights 277A'. Thus, as Selsyn rotor 74 is turned windings 170A and 170A' and all other windings are illuminated in such sequence that there appears to be a rotating field.

Since the order in which the lights behind the different windings reach a maximum intensity determines the apparent direction of rotation of the field, such apparent rotation can be reversed by reversing the order in which such illumination occurs. This can be effected by reversing double-pole double throw switches 236, 268 and 223 (Fig. 15), which move in unison under the influence of tierod 248.

Operation of an induction motor can be illustrated as follows. The starting of an induction motor can be demonstrated by rotating Selsyn rotor 74 that in turn rotates Selsyn 179 at any suitable speed and reciprocating clutch-knob 202 (Fig. 14) to the right to bring friction facing 197 of pulley 195 into contact with friction facing 186 of driving disc 184. The speed of rotation of pulley 195 is increased gradually from zero to approximately the speed of rotation of driving disc 184 and by means of belt 212 causes rotation of pulley 153, main shaft 148 and induction disc 143 to a speed of about 90% of the speed of the rotating field simulated by lights 172 and 173. Normal slipping between disc 143 and the rotating electrical field is illustrated by the lag of index 166 on rotor 143 with respect to the rotating field.

Assuming that it is desired to demonstrate operation of a synchronous motor, it is necessary first to mount synchronous-motor disc 160 in place. Rotation of synchronous-motor disc 160 is effected in the manner just described while it is explained in the demonstration that a synchronous motor has no starting torque and actually it is required that some other means of starting be provided. It is explained during the demonstration that by energizing rotor windings 168, definite poles are established, and said poles are repelled or attracted by poles in the rotating field so that the rotor operates at the same speed as the rotating field. This condition is demonstrated by reciprocating clutch knob 202 to the left as seen in Fig. 14 so that pin 192 seats within slot 187 to lock sprocket-wheel 188 to driving disc 184 and cause the same rotation thereof. By means of sprocket-chain 213, rotation of sprocket wheel 157, main shaft 148 and synchronous-motor disc 160 is effected at the same rate of rotation as the rotating magnetic field.

Since mock generator 10 is in operation during demonstration of mock motor 129, the combination simulates operation of a generator and a motor together, and the characteristics thereof can be explained during the demonstration.

Should it be desired to operate mock motor 129 independently of mock generator 10, jack 216′ is disconnected from mock generator 10 and connected as described previously in conjunction with Fig. 16 Under these conditions, rotor 214 of Selsyn 179 is connected by conductors 215 and 216 to a suitable source of alternating current. Selsyn rotor 214 can be turned by means of hand crank 181′ (Fig. 14) to effect rotation of both main shaft 148 and illumination of lights 172 and 173.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

I claim:

1. In combination, a mock device for simulating interconverting mechanical and electrical energy comprising a pair of members mounted for relative movement, simulated electrical windings on said members, electrical means synchronized with said members for illuminating said windings upon relative movement of said members; a second mock device similar to said first mock device; means interconnecting said mock devices for synchronous actuation of said members; and electrical means whereby said devices can be operated together with one of said devices simulating a generator and the other of said devices simulating a motor of a motor-generator set.

2. In combination, a mock generator comprising a simulated rotor, a simulated stator, simulated electrical windings, electrical means synchronized with said rotor for illuminating said windings to simulate an induced voltage therein upon rotation of said rotor; a mock motor comprising a simulated rotor, a simulated stator, simulated electrical windings, electrical means synchronized with said rotor for illuminating said windings to simulate an electrical voltage for causing movement of said rotor; means interconnecting said rotors and said electrical means for synchronizing movement of said rotors and illuminations of said windings so that said mock generator and said mock motor can be operated together to simulate a mock generator-motor set.

3. A mock electro-mechanical simulated interconverter comprising a rotor member, a stator member, means in one of said members simulating electrical windings, means for illuminating said windings, and electrical means synchronized with said other member for varying the intensity of said illumination to simulate variations in the instant intensity of electrical energization of said windings.

4. A mock electro-mechanical simulated interconverter comprising a rotor member, a stator member, simulated electrical windings on one of said members, means adapted for illumination of said windings, a Selsyn transmitter synchronized with said rotor to vary the intensity of said illumination to simulate variations in the instant intensity of electrical energization of said windings, and means for varying color of illumination to simulate variation in instant direction of simulated current flow.

5. A mock multiphase electro-mechanical simulated interconverter comprising a rotor member, a stator member, simulated phase windings on one of said members, a set of colored lights for illuminating each phase winding to indicate instant flow of current in one direction, a second set of differently colored lights for illuminating each phase winding to indicate instant flow of current in the other direction, a Selsyn transmitter synchronized with said rotor to vary the intensity of illumination in each phase winding to simulate variations of intensity in current flow in said windings corresponding to different instant positions of said rotor, and electrical switches synchronized with said rotor for selecting automatically the set of colored lights for illuminating each phase that corresponds to the instant direction of simulated current flow.

6. A mock multiphase generator comprising a rotor member, a stator member, simulated phase windings on one of said members, a set of colored lights for illuminating each phase winding to indicate instant flow of induced current in one direction, a second set of differently colored lights for illuminating each phase winding to indicate instant flow of induced current in the other direction, a Selsyn transmitter synchronized with said rotor to vary the intensity of illumination in each phase winding to simulate variations of intensity in induced current flow in said windings corresponding to different instant positions of said rotor, and electrical switches synchronized with said rotor for selecting automatically the set of colored lights for illuminating each phase that corresponds to the instant direction of simulated current flow.

7. A mock multiphase motor comprising a rotor member, a stator member, simulated phase windings one one of said members, a set of colored lights for illuminating each phase winding to indicate a voltage of one polarity, a second set of differently colored lights for illuminating each phase winding to indicate voltage of opposite polarity, a Selsyn transmitter synchronized with said rotor to vary the intensity of illumination in each phase winding to simulate variations of intensity of voltage in said windings corresponding to different instant positions of said rotor, and electrical switches synchronized with said rotor for selecting automatically the set of colored lights for illuminating each phase that corresponds to the instant polarity of said voltage.

8. In combination, a mock generator comprising a simulated rotor, a simulated stator, simulated electrical windings, electrical means synchronized with said rotor for illuminating said windings to simulate an induced voltage therein upon rotation of said rotor; a mock motor comprising a simulated rotor, a simulated stator, simulated electrical windings, electrical windings, electrical means synchronized with said rotor for illuminating said windings to simulate a voltage for causing movement of said rotor; and means interconnecting said rotors and said electrical means for synchronizing movement of said rotors and illumination of said windings so that said mock generator and said mock motor con be operated simultaneously to simulate a mock generator-motor set.

GEORGE W. THOMPSON.

REFERENCES CITED

The following references are of record in the file of this patent:

UNITED STATES PATENTS

| Number | Name | Date |
|---|---|---|
| 1,722,659 | Clark | July 30, 1929 |
| 2,200,060 | Geiser | May 7, 1940 |
| 2,203,594 | Daugherty | June 4, 1940 |
| 2,222,309 | Dunkelberger | Nov. 19, 1940 |
| 2,245,110 | Marcaccio | June 10, 1941 |

FOREIGN PATENTS

| Number | Country | Date |
|---|---|---|
| 179,081 | Great Britain | 1922 |
| 457,327 | Germany | 1928 |
| 587,544 | Germany | Nov. 4, 1933 |